Feb. 20, 1945. E. M. S. McWHIRTER ET AL 2,369,678
ELECTRICAL REMOTE CONTROL OR SUPERVISORY SYSTEMS
Filed Dec. 11, 1942
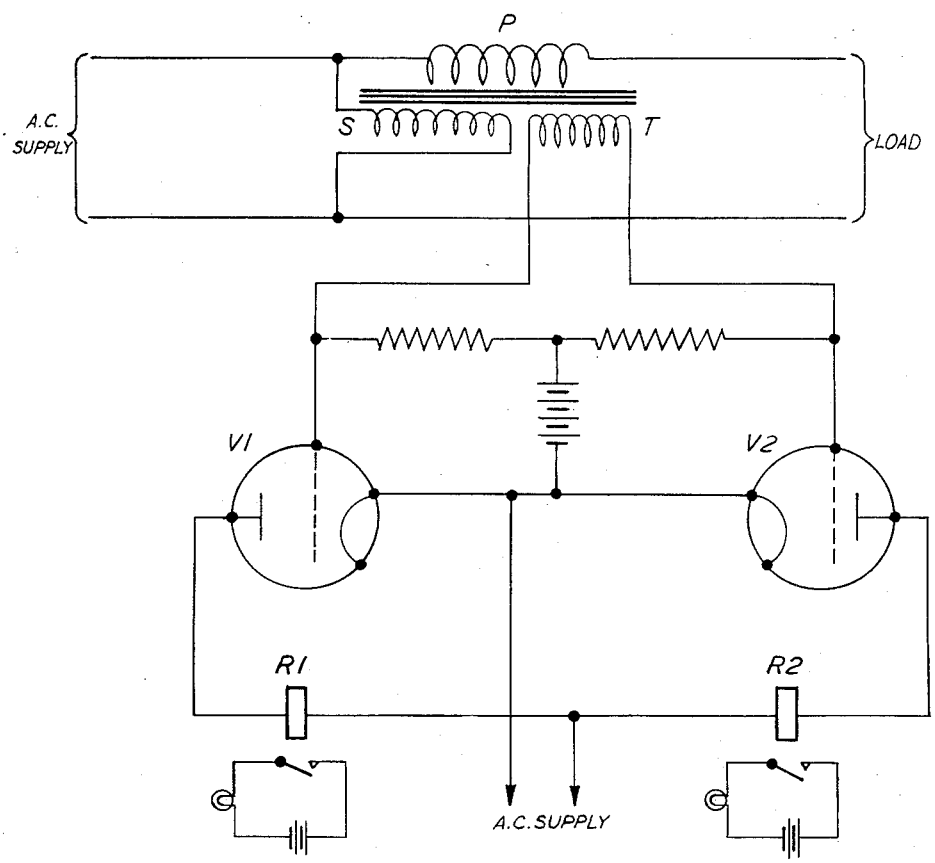

Patented Feb. 20, 1945

2,369,678

UNITED STATES PATENT OFFICE 2,369,678

ELECTRICAL REMOTE CONTROL OR SUPERVISORY SYSTEM

Eric Malcolm Swift McWhirter, Ronald Harris Dunn, Cyril Herbert Chambers, and Frederick William Warden, London, England Application December 11, 1942, Serial No. 468,622
In Great Britain December 18, 1941

3 Claims. (Cl. 172—245)

This invention relates to arrangements for indicating variations in the load on an electric power supply.

In our prior British specification No. 547,605 we have described an arrangement for indicating variations in the load on an electric power supply regardless of variations that may occur in the supply voltage, this arrangement consisting of three coils, which may conveniently be referred to as primary, secondary, and test coils, the primary being connected in series with the load, the secondary in shunt, and the test coil being located in a part of their common field at which the primary and secondary substantially neutralise one another. With such an arrangement, a variation in the load, either by way of increase or decrease, destroys the balance and thus gives rise to an electromotive force in the test coil.

The present invention has for its object to provide an arrangement of this kind which will indicate the sense of the variation, whether it is an increase or a decrease.

The invention consists in an arrangement for indicating variations in the load on an alternating electric supply by the induction of a current in a test coil disposed in a normally balanced field between a coil in series with the load and a coil in shunt, characterised by means for determining the phase of said induced current with respect to the supply current, in order to determine the sense of the variation.

The invention will be described with reference to the accompanying drawing.

Windings P and S, as in the above-mentioned prior patent specification, are arranged to produce opposing mmf.'s in the core of the transformer, and the iron is operated at or near a zero condition. Winding T gives a voltage when the balance is disturbed, this voltage being approximately proportionate to the extent of the unbalance, and the phase reverses for increase or decrease. This reversal can be employed as an indication of increase or decrease, or as a controlling means suitably amplified by any well known means to restore the driving current to its predetermined value.

The reversal can be detected by a valve circuit consisting of two valves V1 and V2 connected across winding T and thus, when an electromotive force is induced in the coil T, receiving an A. C. potential on the grids in phase opposition. The anode supply is alternating, and approximately in phase with the supply feeding the circuits connected to P and S. The valve grids normally carry a negative D. C. bias to reduce the anode current almost to zero. Each valve can pass anode current only during that half cycle in which its anode is positive with respect to its grid. On a variation in the load, the grids will be made positive and negative respectively by winding T, either in phase with the supply or in anti-phase, according to the sense of the variation. Therefore, the valve whose grid receives a positive half cycle during the positive half cycle on its anode, will pass anode current to operate the relay R in its anode circuit. Thus, relay R1 will operate for an unbalance in one sense and relay R2 for an unbalance in the other sense.

The circuit by which relays R1 and R2 are caused to control the current in winding P or the voltage in winding S to restore balance are not shown, as these will vary, and in general be well known for the different applications to which this particular invention can be applied. One successful application of this invention has been to the control to a constant value of electric arc furnaces used for steel and metal smelting.

It will be understood that the invention may take other forms. In particular, gas- or vapour-filled electron discharge devices which have a trigger action may be used, examples being the thyratron and the cold cathode tube.

What is claimed is:

1. An arrangement for indicating variations in the load on an alternating electric supply comprising a coil in series with the load and a coil in shunt therewith and magnetically coupled in normally balanced relation, a test coil disposed in the normally balanced field of the series and shunt coils, two similar electron discharge tubes having their grids connected to opposite ends of the test coil and their anodes and cathodes connected to opposite sides of an A. C. source in substantial synchronism with the first mentioned supply and biased to operate only when both grid and anode are subjected to positive half cycles, relays connected to be energized by the respective tube circuits and indicating means controlled by each of the relays.

2. An arrangement for indicating variations in the load on an alternating electric supply comprising a coil in series with the load and a coil in shunt therewith and magnetically coupled in normally balanced relation, a test coil disposed in neutral coupled relation to the field of the series and shunt coils, two similar electron discharge tubes having their grids connected to opposite ends of the test coil and their anodes and cathodes connected to opposite sides of an A. C.

source in substantial synchronism with the first mentioned supply and biased to operate only when both grid and anode are subjected to positive half cycles, relays connected to be energized by the respective valve circuits, and indicating means controlled by the relays.

3. An arrangement for indicating variations in the load on an alternating electric supply comprising a coil in series with the load and a coil in shunt therewith, said coils being magnetically coupled in normally balanced relation, a test coil in neutral coupled relation to the field of series and shunt coils, two similar electron discharge tubes having their grids connected to opposite ends of the test coil and their anodes and cathodes connected to opposite sides of an A. C. source in substantial synchronism with the first mentioned supply, a battery connected to the cathodes and through resistances to the grids for biasing the grids and cathodes to operate only when both grids and anodes are subjected to positive half cycles of both A. C. sources, relays connected to be energized by the respective tube circuits and indicating means controlled by each of the relays.

ERIC MALCOLM SWIFT McWHIRTER.
ROLAND HARRIS DUNN.
CYRIL HERBERT CHAMBERS.
FREDERICK WILLIAM WARDEN.